United States Patent
Tester et al.

(10) Patent No.: US 8,444,115 B2
(45) Date of Patent: May 21, 2013

(54) CABLE MANIPULATOR

(75) Inventors: John T. Tester, Flagstaff, AZ (US); Andrew J. Dethlefs, Concord, CA (US)

(73) Assignee: Arizona Board of Regents Acting for and on behalf of Northern Arizona University, Flagstaff, AZ (US)

( * ) Notice: Subject to any disclaimer, the term of this patent is extended or adjusted under 35 U.S.C. 154(b) by 593 days.

(21) Appl. No.: 12/276,242

(22) Filed: Nov. 21, 2008

(65) Prior Publication Data

US 2009/0134266 A1    May 28, 2009

Related U.S. Application Data

(60) Provisional application No. 60/989,674, filed on Nov. 21, 2007.

(51) Int. Cl.
*H02G 1/00* (2006.01)

(52) U.S. Cl.
USPC .......................... 254/134.3 FT; 254/134.3 R

(58) Field of Classification Search
USPC .......................... 254/393, 134.3 FT, 394–398
See application file for complete search history.

(56) References Cited

U.S. PATENT DOCUMENTS

| | | | | |
|---|---|---|---|---|
| 4,830,340 A | * | 5/1989 | Knitig | 254/391 |
| 5,921,353 A | * | 7/1999 | Day | 188/65.4 |
| 6,705,179 B1 | * | 3/2004 | Mohtasham | 74/505 |
| 2008/0083912 A1 | * | 4/2008 | Reznar | 254/323 |

OTHER PUBLICATIONS

Raoof, M. and Kraincanic, I., "Simple Derivation of the Stiffness Matrix for Axial-Torsional Coupling of Spiral Strands," Computers & Structures, vol. 55, No. 4, 1995, pp. 589-600.

Filiatrault, Andre and Stearns, Christopher, "Flexural Properties of Flexible Conductors Interconnecting Electrical Substation Equipment," Journal of Structural Engineering, ASCE, Jan. 2005, pp. 151-159.

Beckman, Michael S., Ganatra, Ravindra H. "Flexibility and Springback Characteristics of 600 Volt Insulated Conductors," IAEI News, Jul./Aug. 1997, pp. 30-34.

* cited by examiner

*Primary Examiner* — Lee D Wilson

(74) *Attorney, Agent, or Firm* — Christie, Parker & Hale, LLP

(57) ABSTRACT

A cable manipulator includes a base and a plurality of plates attached to the base, each of the plurality of plates including a pair of cams attached to each plate. Each cam of the pair of cams is spaced from each other such that a length of cable can be inserted therebetween. At least one of the plurality of plates is a rotatable plate such that rotation of the rotatable plate causes an end of the cable to be moved closer to the cable manipulator.

12 Claims, 7 Drawing Sheets

CABLE MANIPULATOR

CROSS-REFERENCE TO RELATED APPLICATION(S)

This application claims priority to and the benefit of U.S. Provisional Application No. 60/989,674, filed at the United States Patent and Trademark Office on Nov. 21, 2007, the entire content of which is incorporated herein by reference.

BACKGROUND

Commercial-grade electrical service is provided to facilities via heavy-duty, large gauge aluminum cable. Large transformers distribute the main power supplied by the power lines through an underground conduit that houses the electrical cables. Often, the cables are bundled into groups of four called a quadriplex. The quadriplex exits the conduit and enters the main electrical service cabinet for the facility where it can be connected to the main bus bar to provide electrical power to a desired location. Before the quadriplex can be terminated into the main bus bar, each cable of the quadriplex should be cut to an appropriate length and have the insulation covering each cable stripped from the end of the cables. Then the cable can be manipulated under and into the main bus bar, which involves maneuvering the cable such that an end of the cable can be retracted to be inserted into the receptacle, but also be extended to be properly aligned to allow for complete insertion into the main bus bar. Typically, the manipulation of the quadriplex occurs in a confined space of the service cabinet and may involve the manipulation of multiple quadriplexes. Due to the thickness and rigidity of the cables, a large amount of torque is often necessary to manipulate the quadriplex into the proper position and alignment for insertion into the main bus bar.

Currently, the commercial-grade electrical power cables are manipulated manually by utility company linemen. However, the confined space in which the manipulation occurs combined with the extreme stiffness of the electrical cable requires high magnitude forces that may result in soft-tissue repetitive motion injuries to the linemen, thereby creating a hazardous work environment for the linemen. Additionally, due to the confined space available for cable manipulation, manually maintaining the cable in the proper plane for alignment with the main bus bar is difficult.

SUMMARY

A cable manipulator according to an embodiment of the present invention includes a base and a plurality of plates attached to the base, each of the plurality of plates including a pair of cams attached to each plate. Each cam of the pair of cams is spaced from each other such that a length of cable can be inserted therebetween. At least one of the plurality of plates is a rotatable plate such that rotation of the rotatable plate causes an end of the cable to be moved closer to the cable manipulator. Each cam of the cable manipulator may be generally circular and may include an annular groove dimensioned to receive a cable.

In one embodiment, the plurality of plates are configured such that a length of cable inserted between each pair of cams extends along a first plane and, upon rotation of the rotatable plate, the length of cable between each pair of cams continues to extend along the first plane. Additionally, when a length of cable is between the pair of cams of the rotatable plate, rotation of the rotatable plate may cause a first section of the length of cable to be moved generally in a first lateral direction and a second section of the length of cable to be moved generally in a second lateral direction.

The cable manipulator may include a plurality of fixed plates, wherein at least one fixed plate is located on either side of the rotatable plate. Additionally, each of the plates may include a plurality of fastening bores for receiving a fastener to attach a plate to the base such that the plate can be placed in a plurality of locations on the base. Further, the base may include at least one fastening bore for receiving a fastener to attach a plate to the base and each of the plates may include at least one fastening bore for receiving a fastener to attach a cam to the plate. The base and each of the plurality of plates may comprise aluminum.

The base may include a bearing-supported penetration configured to receive an input shaft attached to the rotatable plate, wherein the bearing-supported penetration is rotatable with respect to the base. Further, rotation of the rotatable plate may be provided by a gear system connected to the input shaft, the gear system drivable by an automatically operated driver or manually.

Also provided by an embodiment of the present invention is a method for manipulating an effective length of a cable including providing a cable manipulator as described above and inserting a cable into the cable manipulator such that a length of cable extends between each of the plurality of plates. Then, the rotatable plate may be rotated in a first direction such that an end of the cable is drawn toward the cable manipulator. The method may further include rotating the rotatable plate in a second direction opposite the first direction such that the end of the cable is extended away from the cable manipulator. Additionally, the base may define a planar surface and the rotatable plate may be rotated in a plane substantially parallel to the planar surface.

DETAILED DESCRIPTION OF THE INVENTION

A cable manipulator is provided for mechanically manipulating the effective length of a heavy-duty commercial-grade electrical cable such that the effective length of the cable can be "reduced" and "lengthened" as necessary. As will be understood, the actual length of the cable remains constant, but the cable manipulator allows an end of the cable to be moved relative to a fixed point, such as the cable manipulator, within a confined space such that the end of the cable may be, for example, moved toward the fixed point to be aligned and installed onto a main bus bar of an electrical cabinet and then moved away from the fixed point for complete insertion into the main bus bar. Additionally, the cable manipulator allows the cable to be maintained in a constant plane during retraction and extension despite the tendency of a coiled cable to become biased out of the plane in which it is coiled or otherwise manipulated. Further the cable manipulator allows a relatively small input torque to generate a large output force required to manipulate heavy-duty commercial grade electrical cable.

Figure 1:
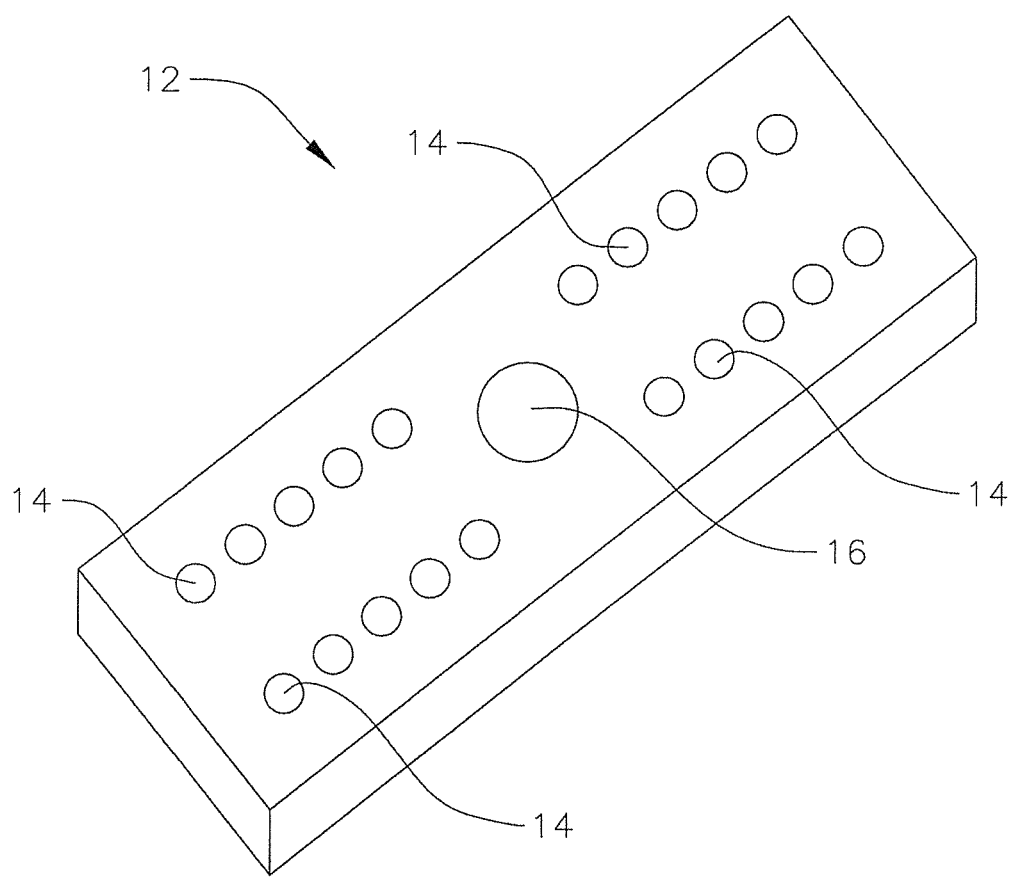
FIG. 1 is a schematic orthogonal view of a base of a cable manipulator according to an embodiment of the present invention.

With reference now to FIG. 1, a base 12 for the cable manipulator 10 (FIG. 6) is provided to serve as a chassis on which various suitable elements of the cable manipulator can be rigidly mounted. In one embodiment, the base 12 is generally rectangular and includes a rigid material that can withstand the torsional forces that may be applied to it during operation of the cable manipulator. Additionally, the base 12 may include or be configured to be connected to a gear system for operating the cable manipulator. The base 12 may include, for example, aluminum.

The base 12 may include a bearing-supported penetration 16 configured to receive an input shaft 20 from a cam plate 18 (FIG. 2a), as described in more detail below. The bearing-supported penetration 16 is rotatable to allow rotation of the input shaft 20, and therefore rotation of the cam plate 18, relative to the base 12. In one embodiment, the bearing-supported penetration 16 is oriented to be substantially orthogonal to a planar surface of the base 12. Therefore, the cam plate 18 attached to the input shaft 20 can be rotated generally parallel to the planar surface of the base 12.

Further, the base 12 may include a plurality of mounting bores 14 extending through the base for attaching idler plates 24 (FIG. 6) to the base, as described in more detail below. As will be appreciated, various configurations of mounting bores 14 may be used to allow for multiple positions of the idler plates 24 as necessary. As shown in FIG. 1 and in one embodiment, corresponding pairs of mounting bores 14 extend in parallel along a length of the base 12 on either side of the bearing-supported penetration 16 to allow the rigid attachment of the idler plates 24. The mounting bores 14 may be threaded for receiving a threaded fastener such as a screw, but it will be appreciated that the mounting bores may also be configured to receive other types of fasteners, such as bolts, rivets and the like.

Figure 2A:
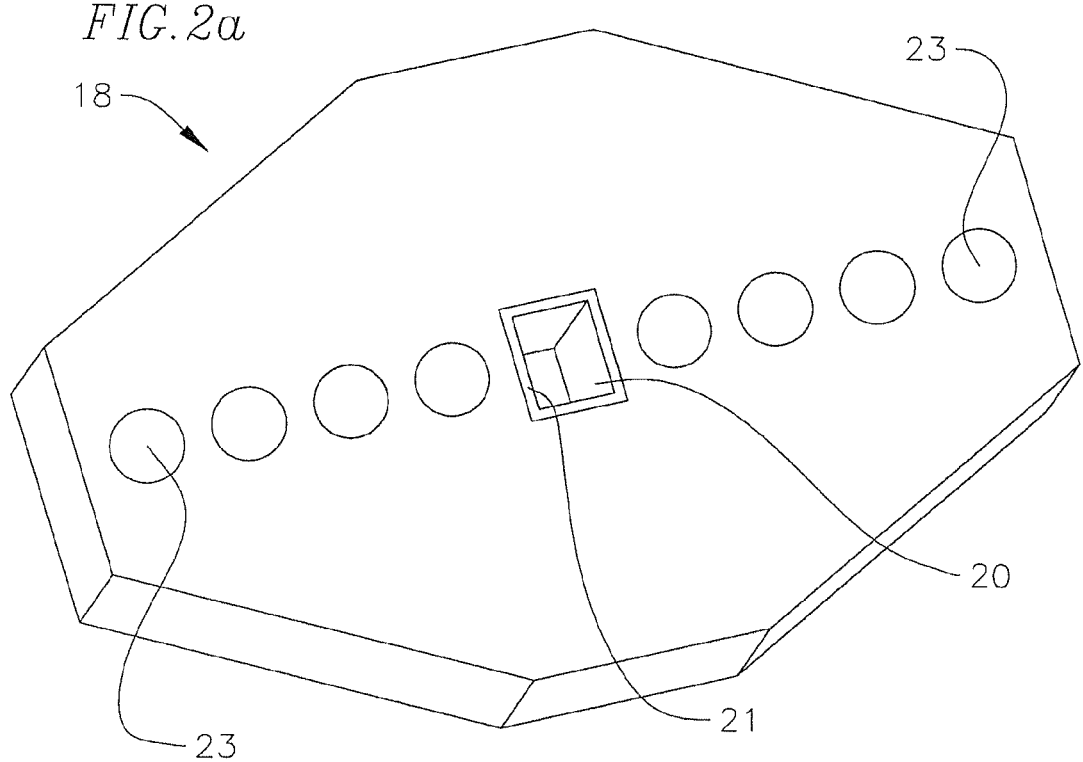
FIG. 2a is a schematic orthogonal view of a cam plate of a cable manipulator according to an embodiment of the present invention.
Figure 3:
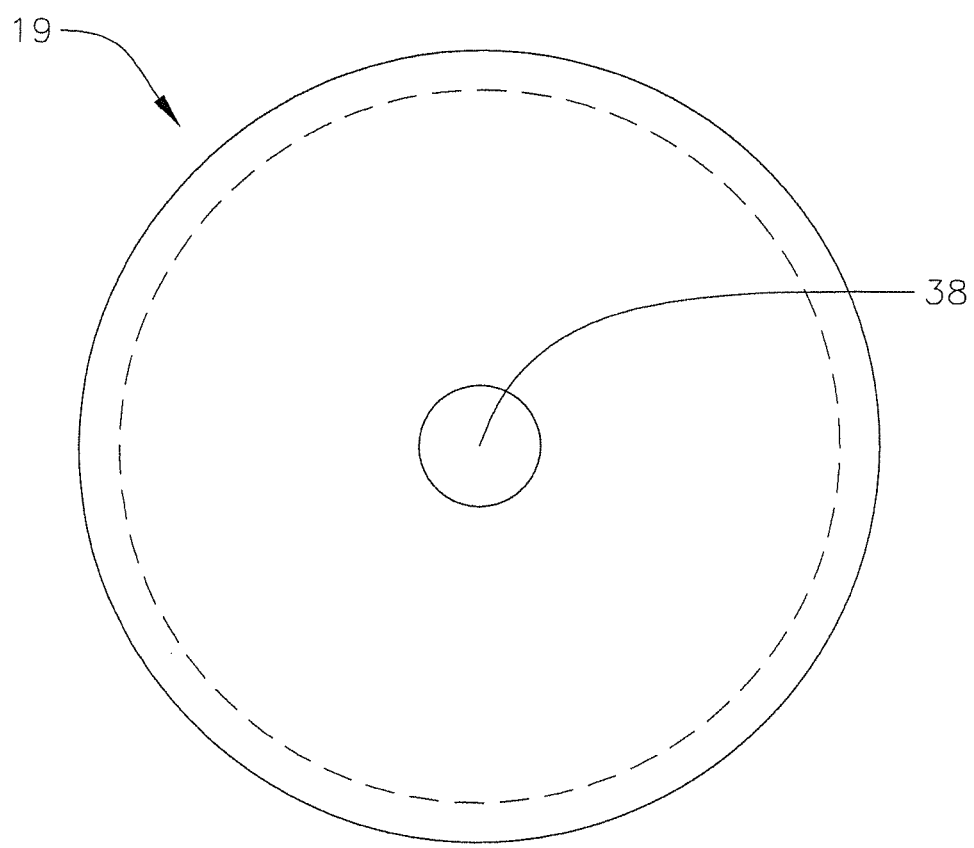
FIG. 3 is a top view of a cam of a cable manipulator according to an embodiment of the present invention.
Figure 6:
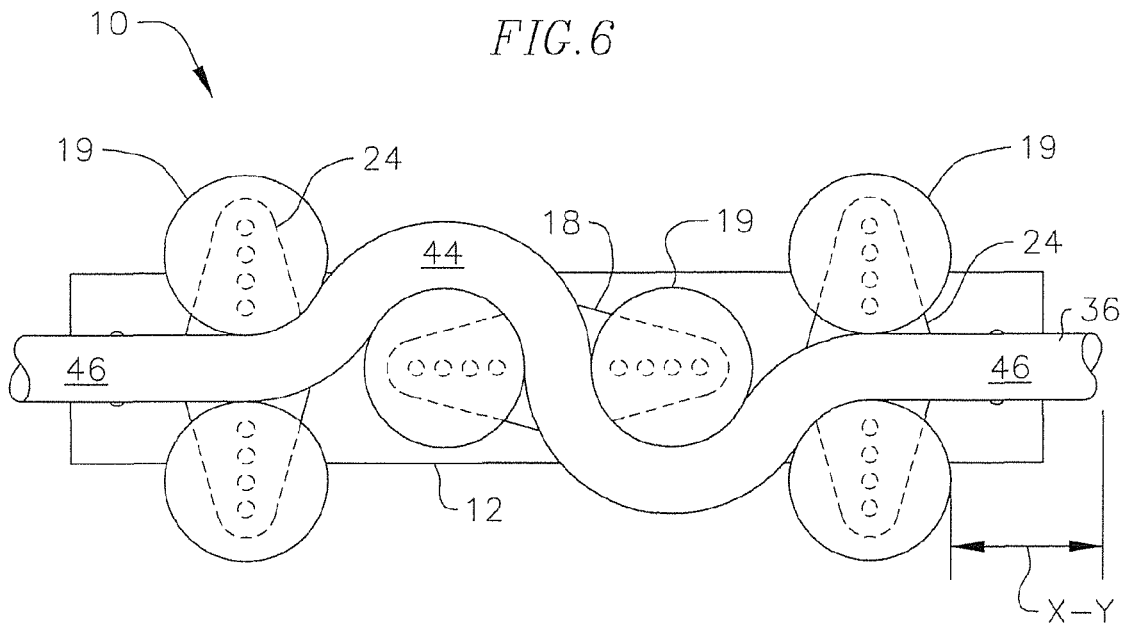
FIG. 6 is a schematic top view of an embodiment of a cable manipulator of the present invention with a cam plate in an activated position.

With reference now to FIG. 2a, a cam plate 18 is provided as a chassis for cams 19 (FIGS. 3 and 6). In one embodiment, the cam plate 18 may be generally diamond-shaped. However, it will be appreciated that the cam plate is not limited to a particular shape, but rather may be any suitable shape providing a surface area for the attachment of cams 19, as described in more detail below.

The cam plate 18 includes an input shaft socket 21 extending through the cam plate for receiving an input shaft 20 to attach the cam plate to the base 12. The input shaft 20 serves as an axle for rotating the cam plate with respect to the base 12. In one embodiment, the input shaft socket 21 may be keyed to eliminate or significantly reduce the chance of slippage during loading.

The cam plate 18 is configured to be rotatable with respect to the base 12. In one embodiment, a surface of the cam plate 18 adjacent to the base 12 is generally flush with a planar surface of the base and is substantially smooth to allow rotation. The cam plate 18, similarly to the base 12, may include a rigid material, for example, aluminum.

The cam plate 18 further includes a plurality of cam plate bores 23 for receiving fasteners to attach cams 19 to the cam plate 18. As will be appreciated, a single cam plate bore 23 may be provided for each cam 19 to be attached to the cam plate 18. However, as shown in FIG. 2, a plurality of cam plate bores 23 may be provided on either side of the input shaft socket 21 for allowing adjustment of the location of cams 19 on the cam plate. In general, the farther a space between the cams 19, the more the length of a cable will be able to be manipulated, as described in more detail below. The cam plate bores 23 may be threaded to accommodate a threaded fastener, but it will be appreciated that any suitable fastener may be used to attach the cam plate 18 to the base 12.

Figure 2B:
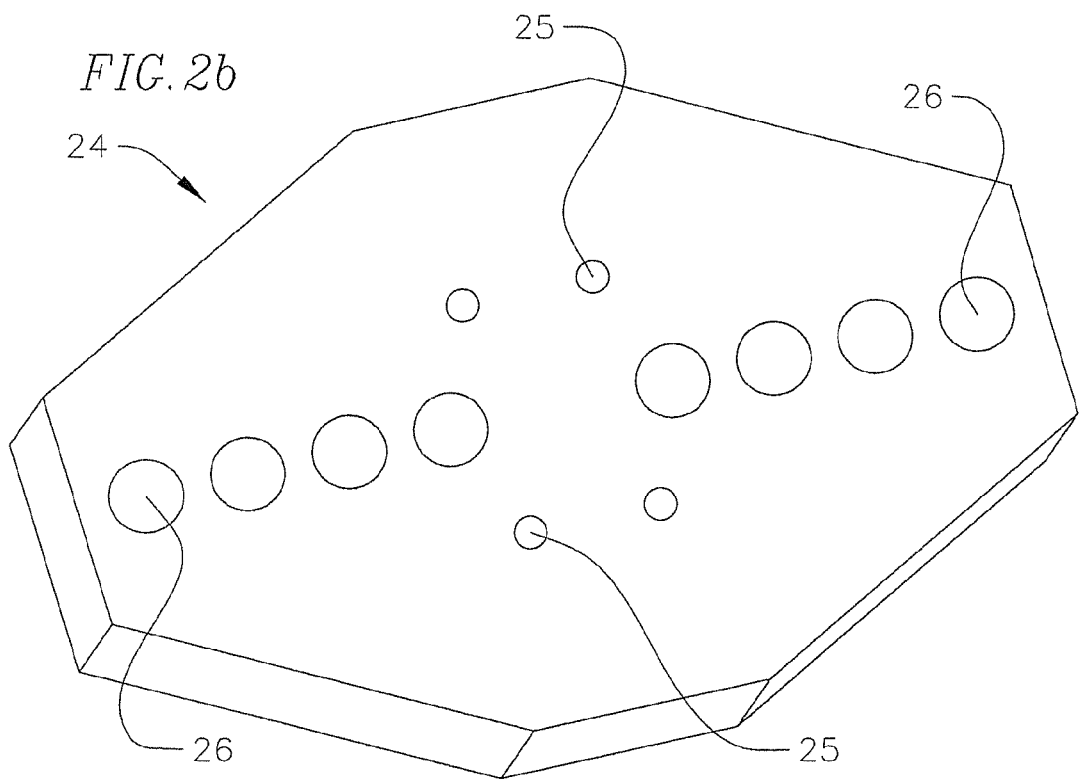
FIG. 2b is a schematic orthogonal view of an idler plate of a cable manipulator according to an embodiment of the present invention.

With reference now to FIG. 2b, an idler plate 24 is provided, the idler plate being attachable to the base 12 to serve as a chassis for the cams 19 that maintain alignment of a cable between the cams and within a constant plane even during manipulation of the cable. As will be appreciated, the idler plates 24 as shown in FIG. 2b are substantially similar in shape to the cam plate 18. However, rather than an input shaft socket, the idler plate 24 includes a plurality of fastening bores 25 for receiving a fastener to attach the idler plates to the base 12. In one embodiment, four fastening bores 25 are arranged in a generally square configuration for rigidly attaching the idler plate 24 to the base 12. Similarly to the cam plate 18, each idler plate 24 has a plurality of idler plate bores 26 for receiving a fastener for attaching a cam 19 to the idler plate, as described in more detail below. The fasteners may be, for example, screws, bolts, rivets or any other suitable fastener for rigidly attaching the idler plate 24 to the base 12.

Figure 4:
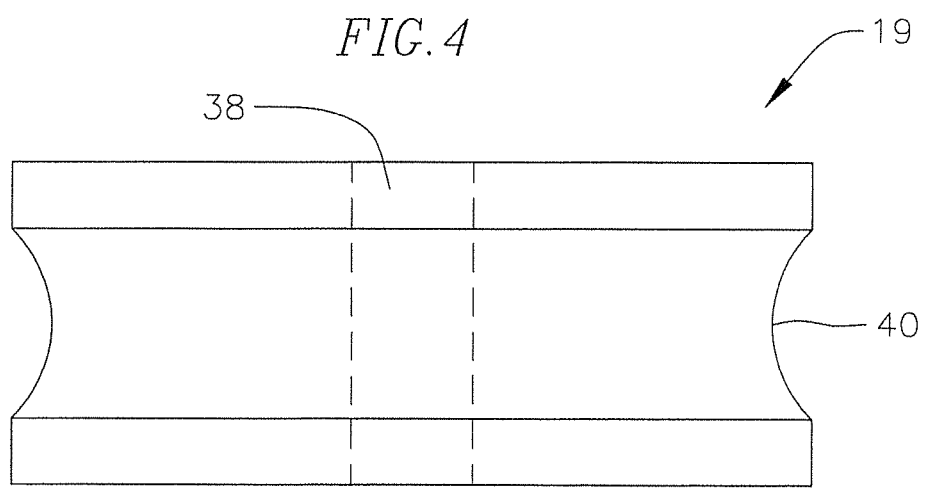
FIG. 4 is a side view of the cam of FIG. 3.

With reference now to FIGS. 3 and 4, a cam 19 is provided and configured to be attached to the cam plates 18 and the idler plates 24. When attached to the cam plate 18, the cams 19 serve to align a length of cable 36 between the cams 19 when the cable manipulator 10 is in a deactivated position (FIG. 5) and serve to manipulate the cable's effective length when the cable manipulator is moved from the deactivated position to the activated position (FIG. 6). When attached to an idler plate 24, the cams 19 serve to align a cable 36 within the cable manipulator 10 when the cable manipulator is in a deactivated position and serve to maintain the cable 36 in a constant plane when the cable manipulator is moved from the deactivated position to the activated position.

In one embodiment, each cam 19 is substantially circular and has a substantially centrally located fastening bore 38 for receiving a fastener to attach the cam 19 to the cam plate 18. As shown in FIG. 4, each cam 19 may have an annular groove 40, and in one embodiment, the annular groove has a radius of curvature generally corresponding to a radius of curvature of the cable 36. Accordingly, when a load is applied to the cams 19 during manipulation of the cable 36, the effect of the cams on the structural integrity of the cable is minimized and the cable can be maintained in a constant plane between the cams. As will be appreciated, the diameter of each cam 18 and the radius of curvature of the annular groove 40 can be varied to accommodate differently-sized cables and to permit a desired amount of cable manipulation.

Figure 5:
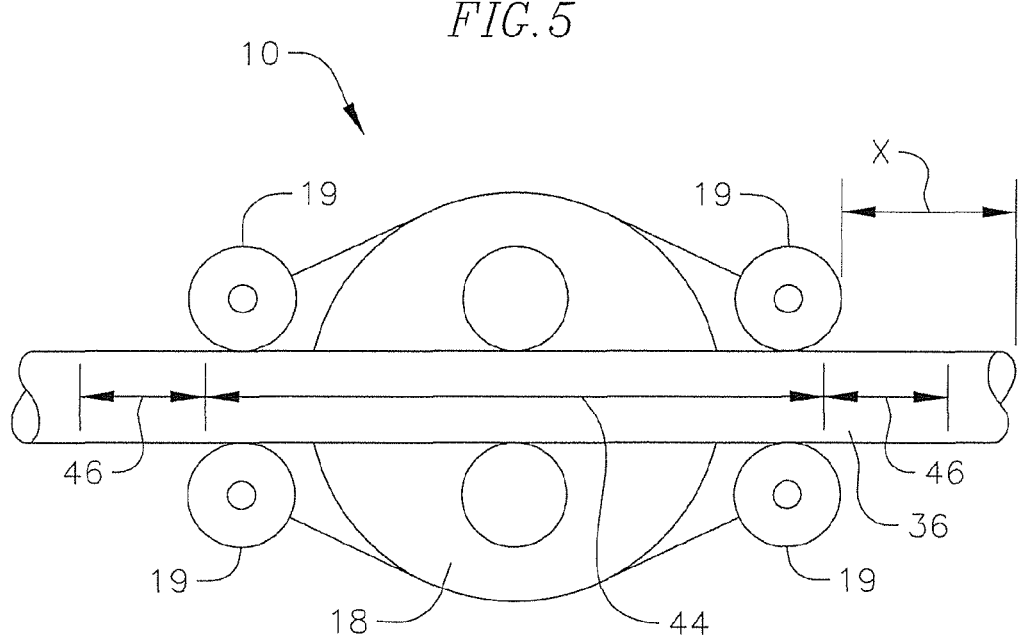
FIG. 5 is a schematic top view of an embodiment of a cable manipulator of the present invention with a cam plate in an inactivated position.

With reference now to FIGS. 5 and 6, the cable manipulator 10 is shown in an inactivated state (FIG. 5) and an activated state (FIG. 6). In one embodiment, the assembled cable manipulator 10 includes the base 12 supporting a pair idler plates 24 fixedly attached to the base. Two cams 19 are attached to each idler plate 24, the cams being spaced from each other to allow a cable 36 to be inserted between each pair of cams. A cam plate 18 is attached to the base 12 between the pairs of idler plates 24, the cam plate being attached to an input shaft connected to the bearing-supported penetration 16 to permit rotation of the cam plate with respect to the base 12. Two cams 19 are attached to the cam plate 18 and spaced from each other to allow the cable 36 to be inserted between the two cams. As noted above, the input shaft is attached to a gear system configured to receive a driver for rotating the input shaft. The driver may be either automatically or manually operated and allows a small input torque to be translated into a large output force. As will be appreciated, although a cable manipulator 10 having two idler plates 24 and a cam plate 18 is described and shown, a cable manipulator having additional idler plates 24 and/or cam plates 18 is contemplated.

Operation of the cable manipulator 10 will now be described with reference to FIGS. 5 and 6. With reference to FIG. 5, a cable 36 is provided having a first end insertable into a desired location. The cable 36 is located such that a length 44 of the cable extends through the cable manipulator 10, and more specifically, that a length of the cable extends between each pair of cams 19 on the idler plates 24 and between the pair of cams 19 on the cam plate 18. As shown in FIG. 5, in an inactivated position of the cable manipulator, the cable section 44 between the pairs of idler plates 24 is generally parallel to a cable section 46 outside of the pairs of idler plates and that the cable section extends in a plane generally parallel to a planar surface of the base 12. With the cable 36 in place in the cable manipulator 10, an end of the cable is located at a certain distance x from a fixed point, such as the edge of a cam 19 attached to an idler plate 24 of the cable manipulator.

In order to manipulate the effective length of the cable 36, the cable manipulator is moved from an inactivated position to an activated position. To move to the activated position, a driver may be used to drive the gear system resulting in rotation of the input shaft 20 and thereby rotation of the cam plate 18. As the cam plate 18 rotates, the cams 19 on the cam plate engage the cable 36 and push the cable in opposite lateral directions from a center toward a periphery of the base 12. Accordingly, as the cable 36 is moved laterally, ends of the cable are moved closer to the cable manipulator, thereby shortening the effective length of the cable. In other words, when the cable manipulator 10 is moved into the activated position, an end of the cable 36 is located at a distance x–y, where y is the aggregate distance by which the effective length of the cable is shortened due to rotation of the cam plate 18. As will be appreciated, the aggregate distance y can be influenced by several factors including the size of the cams 19, the spacing distance between the cams, and the amount of rotation of the cam plate 18. Although FIG. 6 shows a 90 degree rotation of the cam plate 18, it will be appreciated that lesser rotation or additional rotation will cause less or more change, respectively, to the effective length of the cable 36.

Once the cable manipulator 10 has been moved from the inactivated position to the activated position to thereby shorten the effective length of the cable 36, the cam plate 18 may then be rotated in a second direction opposite to the first direction to thereby lengthen the effective length of the cable. As will be understood, the can plate 18 may be rotated all the way back to the inactivated position to restore the effective length of the cable to its original length and to allow removal of the cable from the cable manipulator 10.

Figure 7:
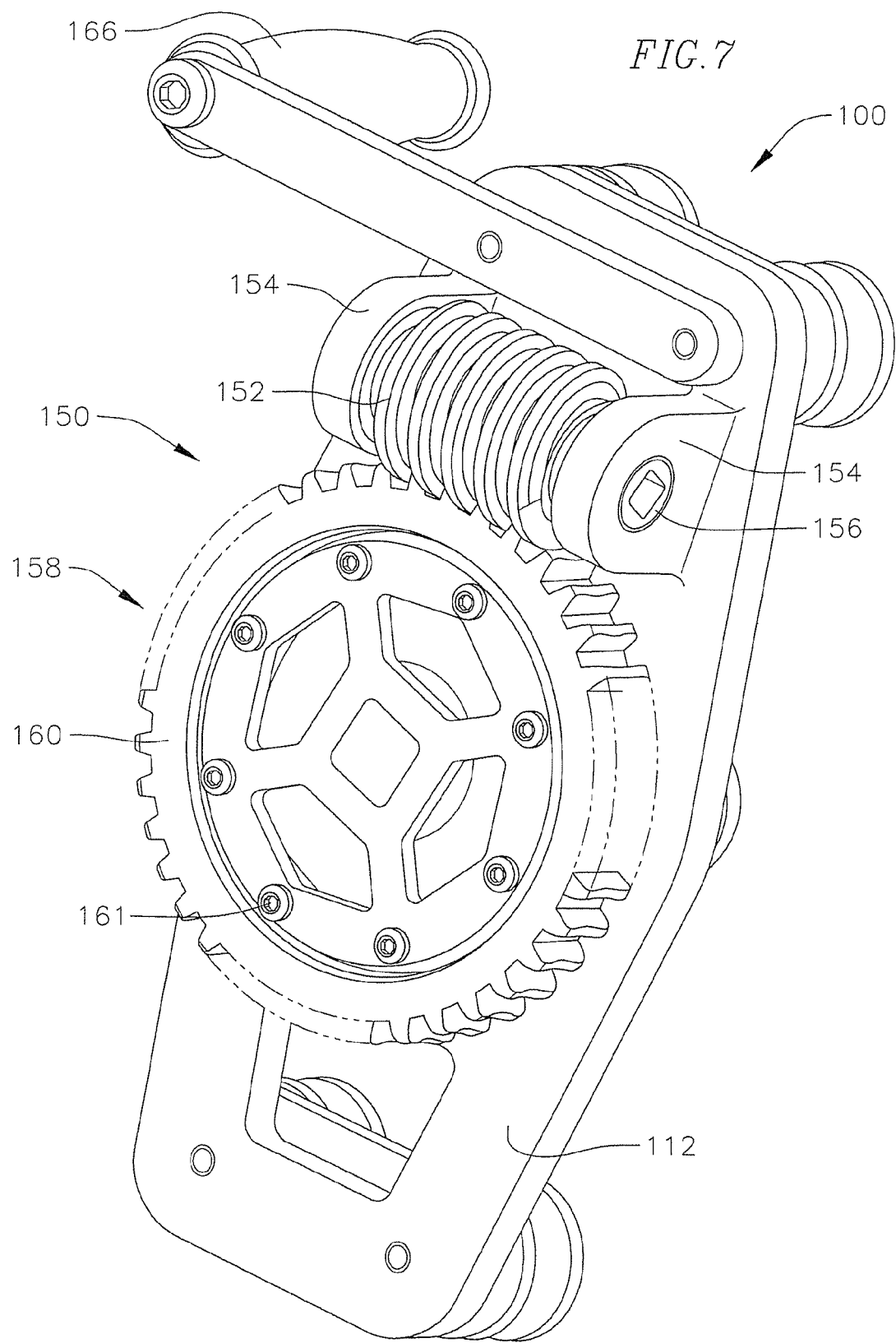
FIG. 7 is an orthogonal bottom view of another embodiment of a cable manipulator of the present invention.
Figure 8:
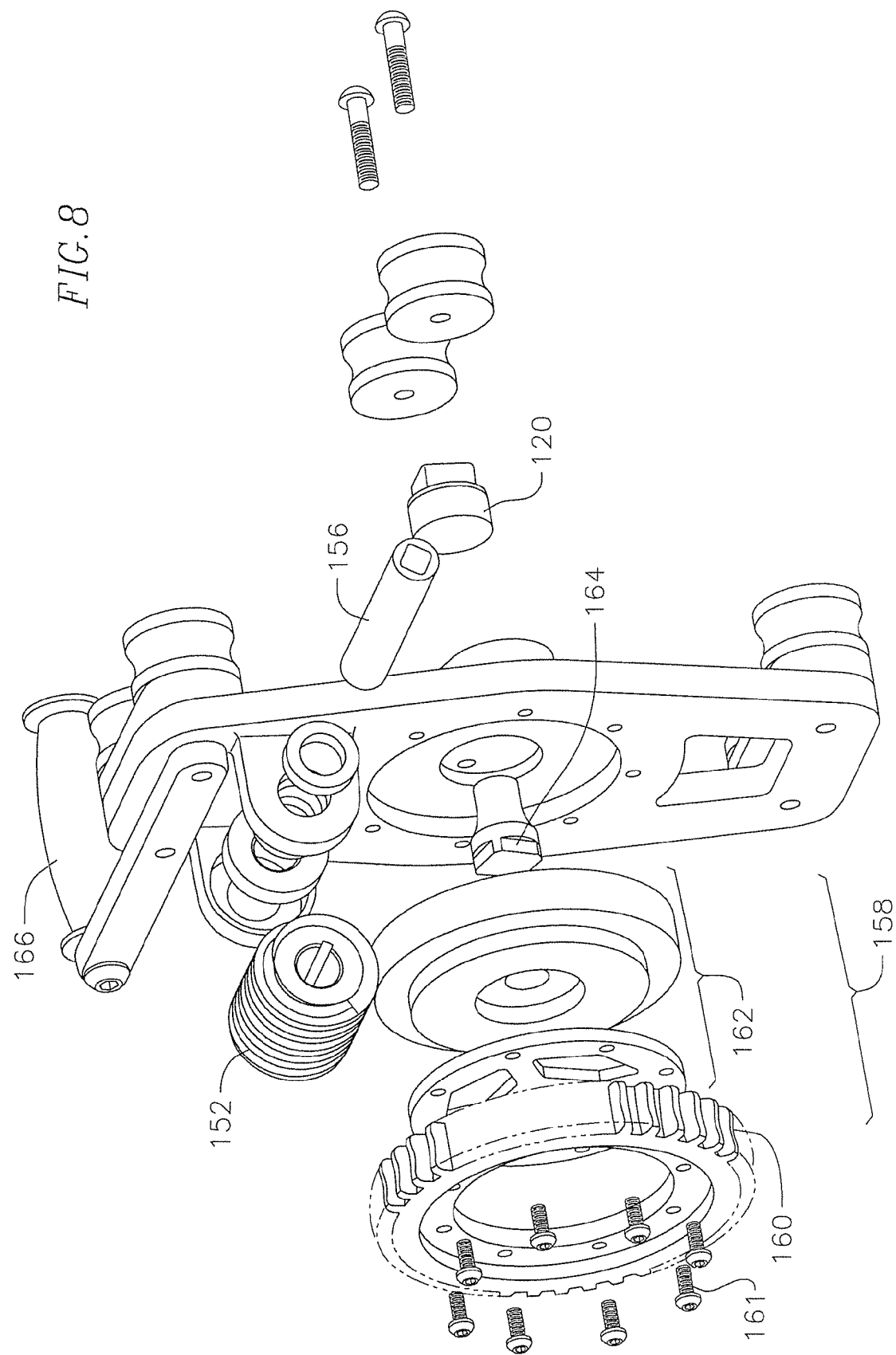
FIG. 8 is an exploded view of the embodiment of the cable manipulator of FIG. 7.
Figure 9:
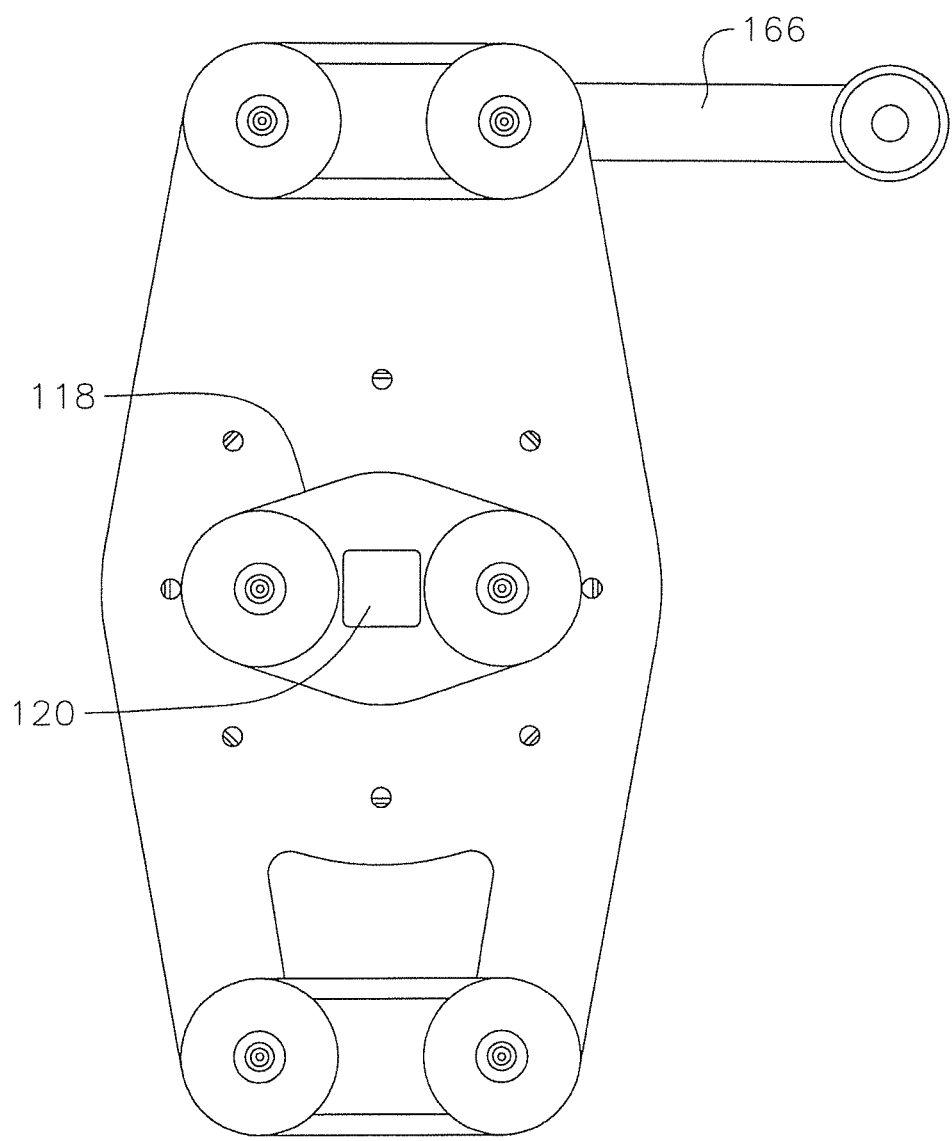
FIG. 9 is a top view of the cable manipulator of FIG. 7.

With reference now to FIGS. 7-9, another embodiment of a cable manipulator 100 is shown. With reference to FIGS. 7 and 8, a gear system 150 for applying torque to the cable manipulator 100 is provided. Given the need for a slow and gradual application of torque, a large gear-reduction unit in the form of a manual hand winch using a worm-drive, as is well know and understood in the art, may be used. The gear system 150 may include a self-locking aspect that allows for the release of input torque while maintaining static equilibrium. In one embodiment, a gear system having a 1:51 gear reduction is incorporated into the cable manipulator 100.

More specifically, an embodiment of the gear system includes a worm gear 152 located between two ears 154 extending from a surface of a base 112. A shaft 156 extends through the worm gear 152, the shaft 156 adapted to receive a driver for driving the worm gear. The ears 154 each include a through hole through which the shaft 156 passes, the through holes providing driver access to the shaft.

The worm gear 152 is configured to drive a planetary gear system 158 including a sun gear 160 and a planetary gear assembly 162. The planetary gear assembly 162 is attached to the sun gear 160 by a plurality of fasteners 161 and is attached to a drive shaft 164 that is connected to a cam plate 118 through an input shaft 120. Similarly to the above-described embodiments, rotation of the sun gear 160 caused by driving the worm gear results in rotation of the cam plate 118.

The cable manipulator 100 may further include a handle 166 attached to the base 112. The handle 166 allows a user to maintain the cable manipulator 100 in a desired location while simultaneously operating the cable manipulator.

Although exemplary embodiments of the present invention have been shown and described, it would be appreciated by those skilled in the art that changes might be made in these embodiments, such as variations in structures, dimensions, type of materials and manufacturing processes, without departing from the principles and spirit of the invention, the scope of which is also defined by the claims and their equivalents.

What is claimed is:

1. A cable manipulator comprising:
   a base;
   a plurality of fixed plates attached to the base and spaced from each other, each of the plurality of fixed plates comprising a pair of cams attached to a respective one of the fixed plates, each cam of the pair of cams being spaced from another cam of the pair of cams such that a length of cable can be inserted therebetween and a rotatable plate between adjacent ones of the fixed plates, the rotatable plate comprising a pair of cams attached to the rotatable plate, wherein the rotatable plate is positioned with respect to each of the fixed plates such that the rotatable plate is spaced from the pair of cams on the fixed plates at any point of its rotation, and wherein rotation of the rotatable plate causes an end of the cable to be moved closer to the base.

2. The cable manipulator of claim 1, wherein the plurality of plates are configured such that the length of cable inserted between each pair of cams extends along a first plane and wherein, upon rotation of the rotatable plate, the length of cable between each pair of cams continues to extend along the first plane.

3. The cable manipulator of claim 1, wherein when the length of cable is between the pair of cams of the rotatable plate, rotation of the rotatable plate causes a first section of the length of cable to be moved generally in a first lateral direction and a second section of the length of cable to be moved generally in a second lateral direction.

4. The cable manipulator of claim 1, wherein the base includes at least one fastening bore for receiving a fastener to attach at least one of the plurality of fixed plates to the base.

5. The cable manipulator of claim 4, wherein each of the fixed plates and the rotation plate includes a plurality of fastening bores for receiving a fastener to attach a respective plate of the fixed plates and the rotation plate to the base such that the respective plate can be placed in one of a plurality of locations with respect to the base.

6. The cable manipulator of claim 1, wherein each of the fixed plates and the rotation plate include at least one fastening bore for receiving a fastener to attach each cam of the pair of cams to the plate.

7. The cable manipulator of claim 6, wherein each of the fixed plates and the rotation plate include a plurality of fastening bores for receiving a fastener to attach each cam of the pair of cams to the plate such that each cam can be placed in one of a plurality of locations on the plate.

8. The cable manipulator of claim 1, wherein each cam is generally circular and includes an annular groove dimensioned to receive a cable.

9. The cable manipulator of claim 1, wherein the base, each of the plurality of fixed plates and the rotation plate comprise aluminum.

10. The cable manipulator of claim 1, wherein the base further comprises a bearing-supported penetration configured to receive an input shaft attached to the rotatable plate, wherein the bearing-supported penetration is rotatable with respect to the base.

11. The cable manipulator of claim 1, wherein rotation of the rotatable plate is provided by a gear system connected to the input shaft.

12. The cable manipulator of claim 11, wherein the gear system is configured to be driven manually.

\* \* \* \* \*